Aug. 15, 1950 W. A. SMITH 2,518,951
LOCATING APPARATUS FOR GLASS BENDING MOLDS
Filed Sept. 22, 1949
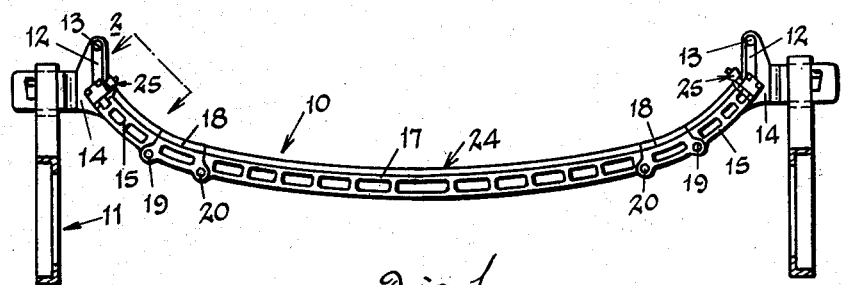
Fig. 1
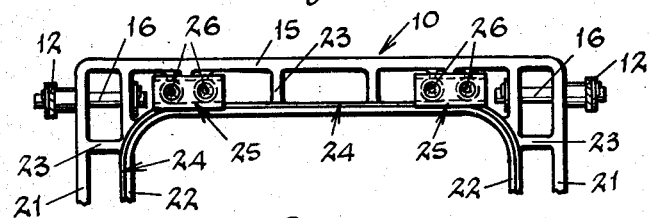
Fig. 2
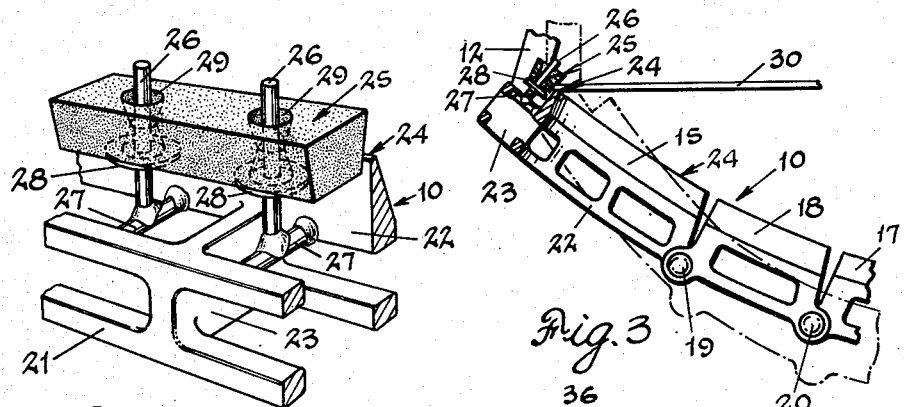
Fig. 3
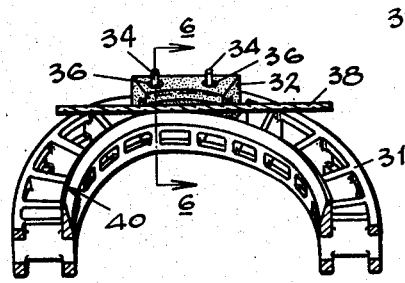
Fig. 4
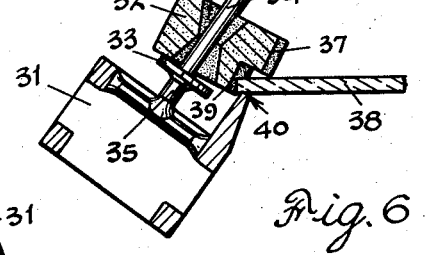
Fig. 6
Fig. 5
Inventor
William A. Smith
By Nobbe & Swope
Attorneys Patented Aug. 15, 1950

2,518,951

UNITED STATES PATENT OFFICE 2,518,951

LOCATING APPARATUS FOR GLASS BENDING MOLDS

William A. Smith, Toledo, Ohio, assignor to Libbey-Owens-Ford Glass Company, Toledo, Ohio, a corporation of Ohio Application September 22, 1949, Serial No. 117,098

12 Claims. (Cl. 49—67)

The present invention relates to the bending of glass sheets or plates, and more particularly to an improved type of locator for positioning glass sheets on bending molds.

Broadly speaking, the present invention is concerned with the bending of glass sheets under the action of heat and gravity and, while not restricted to use with any particular type of bending mold, the locators of the invention are particularly well adapted for employment with so-called hinge type molds and will be described in that connection here. Such molds are made up of a plurality of mold sections, each of which is provided with a portion of the complete bending surface of the mold, hinged together in a manner to permit the sections to be moved from a closed position in which the shaping surface conforms to the curvature desired in a glass sheet to be bent on the mold to an open position in which the sections of the mold are spread apart to an extent sufficient to receive an unbent sheet thereon.

With molds of this type in particular, it is necessary to provide means for locating the glass sheet in bending position on the mold and to retain it in this position during the major part of the bending operation.

It is therefore a primary aim of this invention to provide improved locating devices for the above purpose which will not fuse to the glass edge, which will withstand the high temperatures and repeated heating and cooling cycles to which glass bending equipment is subjected, and which are of a material that is easily workable into the sizes and shapes required by the form or curvature of the glass sheets to be bent.

The special locators of this invention serve a three-fold purpose. They permit rapid and accurate positioning of an unbent sheet in bending position between the ends of the mold and maintain it in proper position during bending; until the glass softens, they will sustain the mold in open position since the glass sheet while flat acts as a rigid strut between the ends thereof; and finally, they will exert endwise pressure on the glass sheet to assist in bending it into contact with the shaping surface of the mold.

Another object is to provide a block type locator of novel construction, loosely mounted adjacent the shaping surface of the mold for positioning glass sheets in bending relation thereto.

Still another object is the provision of locators of the above character, and of heat resisting material, provided with contacting surfaces that are adapted to directively wedge the marginal edge of an unbent glass sheet against the shaping surface.

Other objects and advantages of the invention will become more apparent during the course of the following description, when taken in connection with the accompanying drawings.

In the drawings, wherein like numerals are employed to designate like parts throughout the same:

Fig. 1 is a longitudinal cross section of one form of glass bending mold and a mold supporting framework, with the locators of the invention associated therewith;

Fig. 2 is a fragmentary plan view of one end of the mold of Fig. 1 as seen from line 2—2 of Fig. 1;

Fig. 3 is a fragmentary, longitudinal, sectional view through one end of the mold showing a locating block, as constructed in accordance with the invention, mounted adjacent the shaping surface of the mold;

Fig. 4 is a fragmentary perspective view of the improved locator block and an adjacent portion of the shaping surface of the mold;

Fig. 5 is a view looking toward one end of a bending mold and showing a modified form of locating block in operative position on the mold; and Fig. 6 is a vertical section taken substantially along line 6—6 of Fig. 5.

Referring now to the drawings, there is disclosed in Figs. 1 to 4 inclusive, one form of hinged glass bending mold, designated in its entirety by the numeral 10, and with which the locators of the invention may be used. This mold is pivotally carried by or suspended from a supporting frame 11 by means of links 12 that are arranged at the corners of the mold. More particularly, the links 12 are connected at their upper ends by pins 13 to the side rails 14 of the frame 11, while at their lower ends, the links are pivotally connected to the end sections 15 of the mold 10 by means of pins 16 as shown in Fig. 2.

Each of the end mold sections 15 is generally U-shaped, thus forming the ends and a portion of the sides of the mold. These extending portions of the sections 15 are pivotally associated with central mold sections 17 by intermediate members 18, and the interrelation between these parts is effected by pins 19 and 20 which cooperate to hingedly interconnect the sections 15 to the intermediate members 18 in one instance and the members 18 to the central sections 17 in the other.

The mold parts 15, 17 and 18 are formed of castings of openwork design to provide a maximum of strength and stiffness with a minimum of material. A cross section of the mold thus shows it to be composed of the equivalent of two rails 21 and 22 extending around the mold, and interconnected at intervals by cross webs 23 that serve to hold the rails in spaced relation. The rail 22, occupying the inner side of the mold, is extended upwardly and tapered to provide at its top a narrow continuous shaping surface 24 that conforms to the marginal area of a bent glass sheet.

When a flat glass sheet is to be placed in bending relation to this mold, the sectional parts thereof are separated by rotation on the pins 19 and 20 until, by their distension endwise, the end sections 15 are spaced to receive the end marginal areas of the flat glass sheet thereupon. The links 12 permit this accompanying endwise motion. In order to sustain the mold in its now open position and also to positively locate the flat sheet on the same, the end sections 15 may be provided with the special locator blocks 25 of the invention, adjacent each corner.

As herein provided, each of these blocks 25 is of a molded asbestos composition, loosely or freely tiltable on upright stems or pins 26 of T-shaped inserts 27 mounted in angular relation to and between the rails 21 and 22 of the mold. The block 25 in transverse cross section may have opposed faces or sides thereof angled downwardly and inwardly from one base, or, in this instance, the top surface, so that it generally assumes the form of a trapezium and is positionable on the mold with its smaller base down. This non-parallel relation or arrangement of the sheet contacting faces of the block is selected so that a slight wedging action occurs between the nearly vertical side or face of the asbestos block 25 and the shaping surface 24 to hold the glass firmly in place during the bending operation. The block is supported in position on the pins 26 by suitable stops or locator means, such as washers 28, that are secured thereon. Furthermore, holes 29 through the block 25 to receive the pins 26 are tapered inwardly from each base of the shaped block so that the block may tip in accommodating itself to the edge of a glass sheet. As will be noted, the holes or openings 29 taper or narrow inwardly from the opposed bases or sides of the block to a restricted central portion which is, however, slightly larger in cross section than the pin 26 that extends therethrough.

The molded asbestos blocks are highly suitable for this purpose because of their ability to withstand high temperatures and their machinability. Fig. 3 shows in detail the cooperation of the block 25 and the shaping surface 24 in locating the end of a glass sheet 30 in bending relation to the mold. This particular figure also illustrates the open position of the mold with gaps existing between the mold sections, as indicated by the full lines, while the final position, when the glass settles into contact with the shaping surface, is indicated by the phantom lines.

In operation and when a flat glass sheet is to be placed in bending relation on the mold, the hinged sections thereof are separated by rotation on the pins 19 and 20 until the glass sheet may be inserted between the locator blocks 25 on the opposite end mold sections 15. The mold itself is carried by the links 12 on the supporting frame 11, the links permitting endwise motion of the mold sections to their open position and so that the glass sheet to be bent serves as a strut holding the mold in its open position. As the mold and the glass sheet are passed through the furnace, the glass softens and sags, thus permitting the mold to return to its closed position when and as the glass settles against the shaping surface.

Referring now to Figs. 5 and 6, a differently shaped molded asbestos block is illustrated for holding the glass sheet or sheets in bending relation to the shaping surface of the mold. Thus, in Fig. 5, an end section 31 of a bending mold is illustrated. This end section is continuously curved into a semi-elliptical shape to correspond to the rounded end of a particular form of glass sheet that is to be bent. In this arrangement, the flat glass sheet contacts the ends of the mold over a very short distance at each end and thus tends to be highly unstable in that it tends to tilt one way or the other. To correct this difficulty in this style of mold a molded asbestos block 32 is provided at the ends of the mold in position to contact the end of the glass sheet. This asbestos block 32 is carried on washers 33 fixed to stems 34 of T-shaped supports 35 mounted in the mold section 31.

The block itself has holes 36 to receive the stems 34, the holes 36 being tapered inwardly from both sides of the asbestos block 32, so that the block may tip on the stems 34 without binding. In plan, the side of the block 32 adjacent the glass is curved to conform generally to the outline of the glass. It is furthermore provided with an extending ledge 37 which extends over the glass and rests on its upper surface at spaced apart points, one at each end of the block 32 to prevent the glass sheet 38 from tipping and tending to slide off the mold. A generally vertical surface 39 of the asbestos block 32 serves to maintain the positional relationship of the glass sheet with respect to a shaping surface 40 of the mold 31.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. In apparatus for bending glass sheets or plates, the combination with a hinged mold having a shaping surface and made up of a plurality of sections hinged together for movement into an open position to receive an unbent sheet located in bending position thereon and into a closed position in which the bending surface of the mold conforms to the curvature to which a sheet is to be bent on the mold; of sheet locating members in the form of heat resisting blocks positioned adjacent the shaping surface of the mold to engage opposite edges of an unbent sheet when in bending position on the mold, said blocks being mounted for free tilting movement toward and away from said bending surface during the bending operation.

2. In apparatus for bending glass sheets or plates, the combination with a mold having a shaping surface and made up of a plurality of sections each formed with a portion of said shaping surface on an upper surface thereof, and said sections being hingedly connected together at points below the shaping surface to permit movement of the mold into an open position to receive an unbent sheet located in bending position thereabove and into a closed position in which the shaping surface of the mold conforms to the shape into which a sheet is to be bent on the mold; of locating members in the form of heat resisting blocks positioned adjacent the shaping surface of the mold to engage opposite edges of an unbent sheet located in bending position thereabove, said blocks having sheet contacting faces that are angled from the tops of said blocks downwardly and away from the adjacent portion of the bending surface, and being mounted to tilt freely toward and away from said surface.

3. In apparatus for bending glass sheets or plates, the combination with a mold supporting frame; and a mold swingably suspended from spaced apart points on said frame and made up of a plurality of mold sections hingedly connected together and having a shaping surface formed on upwardly directed surfaces of said sections; of sheet locating elements in the form of heat resisting blocks positioned adjacent the shaping surface of two of said sections at points remote from said hinged connections to contact opposite edges of an unbent glass sheet when located in bending position over said mold, said blocks being in the shape of a trapezium in cross section, and being loosely mounted for universal tilting movement toward and away from said shaping surface.

4. In apparatus for bending glass sheets or plates, the combination with a bending mold having a shaping surface, of means for locating a glass sheet in bending position on said mold comprising a mounting pin carried by said mold in spaced relation to and extending beyond said shaping surface, and a heat resisting block loosely mounted on said pin and having a contacting surface for engagement with an edge of a glass sheet when said sheet is in bending position on said mold.

5. In combination with a glass bending mold having a shaping surface upon which glass sheets can be bent, a pin mounted adjacent said shaping surface and in angular relation thereto, and a heat resisting block loosely carried by said pin in position to engage an edge of a glass sheet on said mold.

6. In combination with a glass bending mold having a shaping surface upon which glass sheets can be bent, a pin mounted adjacent said shaping surface and in angular relation thereto, a heat resisting block having an opening therein of greater cross section than the cross section of said pin and within which the pin is received to loosely mount said block, and stop means on said pin for locating said block in position to engage the edge of a glass sheet arranged in bending position on said mold.

7. In combination with a glass bending mold having a shaping surface upon which glass sheets can be bent, a pin mounted adjacent said shaping surface and in angular relation thereto, a heat resisting block in the shape of a trapezium in cross section loosely carried by said pin in position to engage an edge of a glass sheet arranged in bending position on said mold with one of the non-parallel sides of said block.

8. In combination with a glass bending mold having a shaping surface upon which glass sheets can be bent, a pin mounted adjacent said shaping surface and in angular relation thereto, a heat resisting block having an opening therethrough that narrows inwardly from its opposite ends and through which said pin passes to loosely mount said block, and means for locating said block on said pin in position to engage an edge of a glass sheet located in bending position on said mold.

9. In combination with a glass bending mold having a shaping surface upon which glass sheets can be bent, a pin mounted adjacent said shaping surface and in angular relation thereto, and a heat resisting block having a glass engaging surface and loosely carried by said pin in position to engage an edge of a glass sheet arranged in bending position on said mold with said glass engaging surface, said block having an overhanging ledge adjacent said glass engaging surface for engaging the face of said glass sheet.

10. In combination with a glass bending mold having a shaping surface upon which glass sheets can be bent, a pin mounted adjacent said shaping surface and in angular relation thereto, a heat resisting block loosely carried by said pin and having one face thereof cut out to form a curved glass edge engaging face and a curved glass face engaging portion projecting outwardly beyond said glass edge engaging face, and means for locating said block on said pin in position to engage an edge of a glass sheet arranged in bending position on said mold with said glass edge engaging face and to engage a surface of said sheet with said glass face engaging portion.

11. In combination with a glass bending mold having an upwardly directed portion and a shaping surface on the upper face of said portion, a pair of pins carried by said upwardly directing portion and extending upwardly past said shaping surface, a block of heat resisting material having openings therethrough for loosely mounting said block on said pins, said openings narrowing inwardly from their opposite ends to a restricted portion within the block that is of greater cross section than that of the pins, and stop means on said pins for locating said block in position to engage an edge of a glass sheet when arranged in bending position on said mold.

12. In combination with a glass bending mold having an upwardly directed portion and a shaping surface on the upper face of said portion, a pair of pins carried by said upwardly directing portion and extending upwardly past said shaping surface, a block of heat resisting material having openings therethrough for loosely mounting said block on said pins, said openings narrowing inwardly from their opposite ends to a restricted portion within the block that is of greater cross section than that of the pins, said block having a longitudinally curved face adjacent said mold which is notched to form an overhanging ledge, and stop means on said pins for locating said block in position to receive an edge of a glass sheet within said notched portion when said sheet is arranged in bending position on said mold.

WILLIAM A. SMITH.

No references cited.